US011927998B2

United States Patent
Sultenfuss et al.

(10) Patent No.: US 11,927,998 B2
(45) Date of Patent: Mar. 12, 2024

(54) SYSTEM PERFORMANCE USING OPTIMAL ADAPTER EFFICIENCY

(71) Applicant: DELL PRODUCTS, LP, Round Rock, TX (US)

(72) Inventors: Andrew Sultenfuss, Leander, TX (US); Adolfo Montero, Pflugerville, TX (US); Karun P. Reddy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/342,210

(22) Filed: Jun. 8, 2021

(65) Prior Publication Data
US 2022/0390996 A1    Dec. 8, 2022

(51) Int. Cl.
*G06F 1/26* (2006.01)
*G06F 1/16* (2006.01)
*G06F 1/3234* (2019.01)
*G06F 13/40* (2006.01)

(52) U.S. Cl.
CPC .............. *G06F 1/26* (2013.01); *G06F 1/266* (2013.01); *G06F 1/1632* (2013.01); *G06F 1/3253* (2013.01); *G06F 13/40* (2013.01)

(58) Field of Classification Search
CPC .......... G06F 1/26; G06F 1/266; G06F 1/1632; G06F 13/40; G06F 1/3253
USPC ................... 713/300, 340; 710/100
See application file for complete search history.

(56) References Cited

U.S. PATENT DOCUMENTS

| 7,653,772 | B2 * | 1/2010 | Hayashi | G06F 1/26 |
| | | | | 713/340 |
| 8,266,456 | B2 * | 9/2012 | Chang | G06F 1/266 |
| | | | | 713/300 |
| 9,891,682 | B1 * | 2/2018 | Czamara | G06F 1/266 |
| 10,635,151 | B2 | 4/2020 | Kim | |
| 10,955,888 | B2 | 3/2021 | Wang et al. | |
| 2002/0162036 | A1 * | 10/2002 | Kim | G06F 1/266 |
| | | | | 713/300 |
| 2007/0091656 | A1 * | 4/2007 | Navid | H01R 31/065 |
| | | | | 363/63 |

(Continued)

*Primary Examiner* — Ji H Bae
(74) *Attorney, Agent, or Firm* — Larson Newman, LLP

(57) ABSTRACT

A power adapter provides power to an information handling system. The power adapter includes a power supply and a power delivery controller. The power supply receives an alternating current (AC) input at one of a plurality of input voltages, and provides a direct current (DC) output at one of a plurality of output voltages, each output voltage being associated with a current limit. The power delivery controller determines, upon being plugged into an AC power source, a first input voltage of the AC power source, determines a DC power delivery capability of the information handling system, sets a first output voltage and a first current limit of the power supply DC output based upon the first input voltage and the DC power delivery capability, the first output voltage and the first current limit defining a first power limit to the information handling system, determines that the power supply can provide a second power limit that is greater than the first power limit based upon an operating condition of the power supply, and communicates the second power limit to the information handling system.

15 Claims, 3 Drawing Sheets

(56) References Cited

U.S. PATENT DOCUMENTS

| | | | |
|---|---|---|---|
| 2007/0220286 A1* | 9/2007 | Benton | G06F 1/3203 |
| | | | 713/300 |
| 2017/0133842 A1* | 5/2017 | Freeman | H02M 3/07 |
| 2018/0232021 A1* | 8/2018 | Perchlik | G06F 1/203 |
| 2019/0212795 A1* | 7/2019 | Moritomo | G06F 21/44 |
| 2020/0393885 A1* | 12/2020 | Ghosh | G06F 1/3296 |
| 2020/0403441 A1* | 12/2020 | Fallon | G06N 20/00 |
| 2021/0135476 A1* | 5/2021 | Shimamura | H04N 1/00907 |

* cited by examiner

SYSTEM PERFORMANCE USING OPTIMAL ADAPTER EFFICIENCY

FIELD OF THE DISCLOSURE

This disclosure generally relates information handling systems, and more particularly relates to providing improved system performance using optimal power adapter efficiency for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A power adapter may provide power to an information handling system. The power adapter may include a power supply and a power delivery controller. The power supply may receive an alternating current (AC) input at one of a plurality of input voltages, and may provide a direct current (DC) output at one of a plurality of output voltages, each output voltage being associated with a current limit. The power delivery controller may determine, upon being plugged into an AC power source, a first input voltage of the AC power source, may determine a DC power delivery capability of the information handling system, may set a first output voltage and a first current limit of the power supply DC output based upon the first input voltage and the DC power delivery capability, the first output voltage and the first current limit defining a first power limit to the information handling system, may determine that the power supply can provide a second power limit that is greater than the first power limit based upon an operating condition of the power supply, and may communicate the second power limit to the information handling system

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
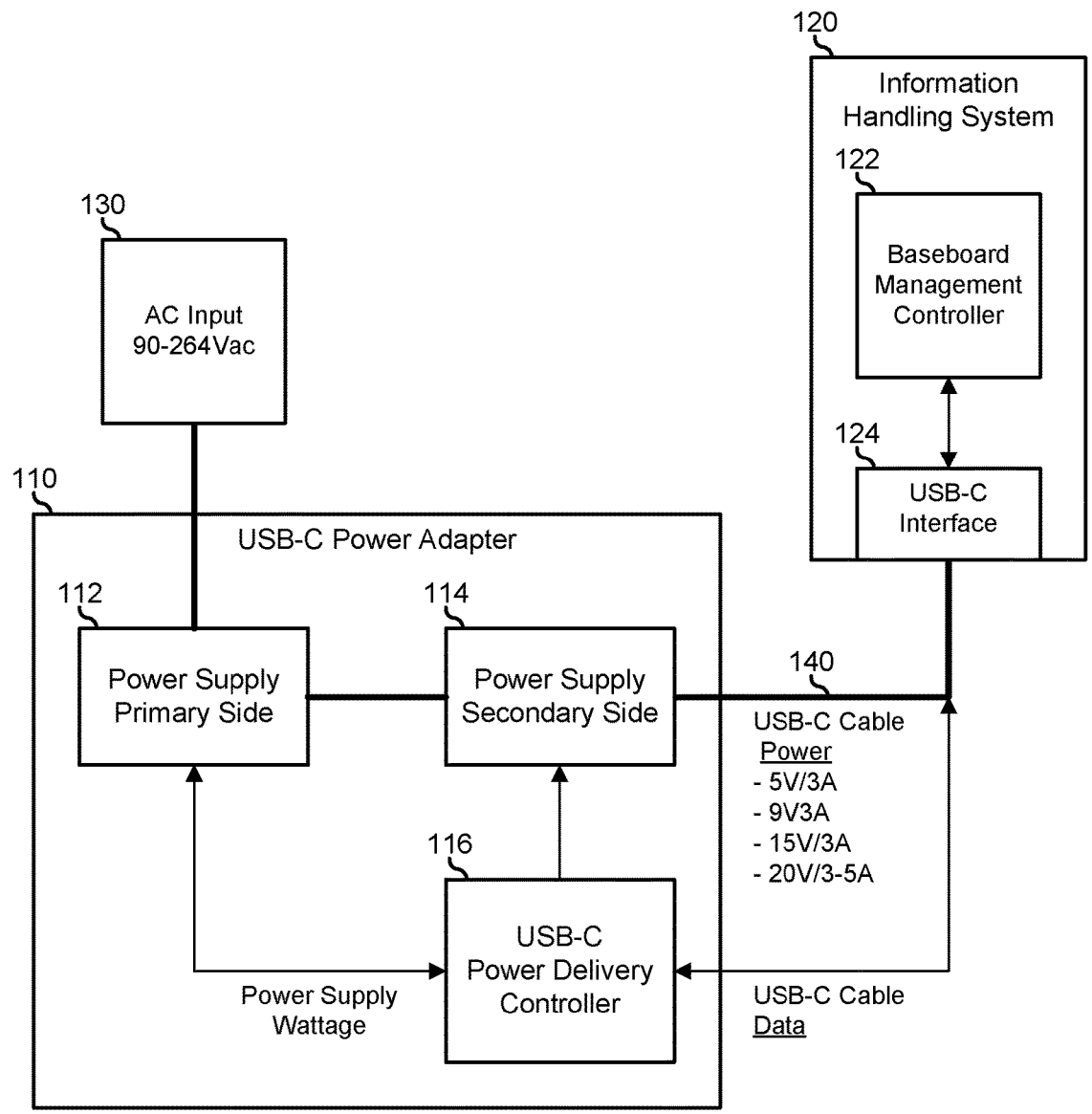
FIG. 1 is a block diagram of a power system for an information handling system according to an embodiment of the current disclosure.

FIG. 1 illustrates a power system 100 including a USB-C power adapter 110, an information handling system 120, and an AC power source 130. Power adapter 110 operates to receive power from AC power source 130 at a particular voltage level, typically an alternating current (AC) voltage at a particular frequency, and to convert the supplied power to a direct current (DC) power source at a different voltage level to power information handling system 120. Power adapter 110 supplies the DC power to information handling system 120 via USB-C cable 140.

AC power source 130 represents a wide variety of international power standards that operates at one of a wide variety of regional voltages and frequencies, from 90-264 VAC and from 50-60 Hz. USB-C power adapter 110 includes a power supply primary side 112, a power supply secondary side 114, and a USB-C power delivery controller 116. Power supply primary side 112 receives the input power from AC input 130 and operates to convert the power from the AC input to a different power level, typically a direct current (DC) voltage level, that is provided to power supply secondary side 114. Power supply secondary side 114 conditions the power received from power supply primary side 112 into various power levels in accordance with the USB 3.1 standard for power delivery over USB-C cable 140 to information handling system 120. Power supply primary side 112 includes various components that operate to provide voltage conversion and rectification, and may include an EMI filter, a bridge rectifier, a half bridge GaN FET device, an active clamp flyback device, a programmable power converter controller, and the like. Power supply secondary side 114 includes various components that operate to provide the various power levels to USB-C cable 140, and may include a synchronous rectifier, a programmable power level controller, and the like. The details of power adapter design are known in the art and will not be further described herein, except as needed to illustrate the current embodiments.

USB-C power delivery controller 116 represents a device that is configurable to control the operation of power supply primary side 112 and power supply secondary side 114, and may typically be provided as an integrated circuit device, as needed or desired. USZB-C power delivery controller 116 operates to communicate with information handling system 120 over USB-C cable 140, to negotiate the power demands and capabilities of the information handling system, and to set the output voltages and current limits of power supply secondary side 114 in accordance with the negotiated parameters. For example, USB-C power delivery controller 116 may determine whether information handling system 120 is configured to receive 5 Volt (V)/3 amp (A) power (15 Watts), 9V/3 A power (27 Watts), 15V/3 A power (45 Watts), 20V/3 A power (60 Watts), or 20V/5 A power (100 Watts) in accordance with the USB 3.1 standard for power delivery.

USB-C cable 140 is illustrated as a dark line for the purposes of power delivery, and as a light line for the purposes of data communication (such as CC1 and CC2 lines). However, it will be understood that USB-C cable 140 is a single cable capable of simultaneous power delivery and data communication in accordance with the USB 3.1 standard. The details of USB-C power delivery and of the negotiation and setting of the power delivery levels are known in the art and will not be further described herein, except as needed to illustrate the current embodiments.

In a typical case, a manufacturer of an information handling system will provide the information handling system in multiple regions, where the power adapters supplied with the information handling system are configured to be optimized to operate in each particular region. As such, a manufacturer may be expected to specify and source multiple power adapters for delivery with the information handling system. In this case, the packaging, delivery, and use of the information handling system may be unique to the particular region, forcing users of the information handling system to obtain multiple power adapters if they desire to utilize the information handling system in different regions.

Moreover, the cost of manufacturing the multiple regional types of power adapters is costly in terms of supply chain management, packaging, warranty service, and the like. In another case, a manufacturer of an information handling system will provide the information in multiple regions, but the power adapters supplied with the information handling system are configured to adapt to the multiple regional power delivery standards. Here, the manufacturer may need to source a single type of power adapter, simplifying manufacturing supply lines, packaging, warranty service, and the like.

It has been understood by the inventors of the current disclosure that, as the power demands of information handling systems increases, including system CPU/GPU Turbo states, sustained high load requirements for low-latency applications, power pass-through applications, rapid recharge cycles, and the like, the demands placed on power adapters is likewise increasing. Here, the advantages of multi-region power adapters are being challenged by the fact that multi-region power adapters must often opt for a "lowest common denominator" design that meets the most restrictive requirements, at the expense of power adapter efficiency, heat generation, service life, and the like.

To the extent that a typical USB-C power delivery controller operates to set the output voltage levels of a power supply secondary side, the setting of the output voltage levels is typically such that once the power levels are negotiated, the power levels are not changed during the course of operation of the associated information handling system unless the information handling system enters a different operating state, such as a different ACPI S-state or the like. In a particular embodiment, USB-C power adapter 110 operates to provide a varying output power level, based upon the operating condition of the USB-C power adapter and of information handling system 120.

In particular, USB-C power delivery controller 116 operates to determine a power supply wattage (PSW) available from power supply primary side 112 and power supply secondary side 114. Here, USB-C power delivery controller 116 may utilize information related to the power quality of AC power source 130, including voltage and frequency stability, DC voltages with USB-C power adapter 110, current power delivery level, temperature information within the USB-C power adapter, the age of the USB-C power adapter, regional information, and the like. In a first case, USB-C power delivery controller 116 operates to optimize the operations of USB-C power adapter 110. For example, USB-C power delivery controller 116 may operate to change the voltage settings of power supply primary side 112 or power supply secondary side 114 to optimize the efficiency of USB-C power adapter 110 based upon the power being supplied to information handling system 120, thereby reducing the heat generated by the USB-C power adapter and increasing the service life and longevity of the USB-C power adapter.

In a second case, USB-C power delivery controller 116 operates to communicate the PSW information to information handling system 120, and the information handling system utilizes the PSW information to condition the operation of the information handling system. In particular, BMC 122 is connected to USB-C interface 124 to receive the PSW information, and the BMC operates to determine whether or not the information handling system can utilize any additional available power based upon the PSW information. Here BMC 122 operates to manage the functions of information handling system 120, such as by increasing a voltage or frequency of operation of a CPU or GPU of the information handling system, by directing a host environment of the information handling system to instantiate one or more additional workloads on the information handling system, by increasing cooling, such as by increasing a cooling fan speed, to enable faster processing of the information handling system, by increasing a charging rate of a battery of the information handling system, or a combination thereof.

In a third case, BMC 122 operates to send a requested PSW to USB-C power delivery controller 116. Here, various operating modes of information handling system 120 may be provided that utilize more power than the negotiated power delivery level as described above. For example, information handling system 120 may have increased performance modes that provide for faster processing and lower latency, but that require additional power to provide the increased performance, the information handling system may have faster charging modes that pass additional power to a battery, the information handling system may have various passthrough modes that permit add-in devices to be connected to the information handling system and that are powered by the information handling system. The various operating modes may be provided with a preset duration, such as a turbo performance mode that is engaged for a short duration (such as several seconds), a quick charge mode that is engaged for a medium duration (such as 5-10 minutes), a pass-through mode that is engaged on a continuous basis, or the like.

BMC 122 operates to determine an amount of additional power that is needed to enter the various modes, and to provide a PSW request to USB-C power delivery controller 116 based upon the mode to be entered. Further, USB-C power delivery controller 116 receives the PSW request and determines whether or not USB-C power adapter 110 can supply the additional power. If so, USB-C power delivery controller 116 operates to modify the operation of power supply primary side 112 and power supply secondary side 124 to supply the additional power to information handling system 120, and to communicate with BMC 122 that USB-C power adapter 110 is set to supply the additional power. If USB-C power adapter 110 can not supply the additional power, USB-C power delivery controller 116 communicates with BMC 122 that the USB-C power adapter can not supply the additional power.

As illustrated, the functions and features of power system 100, and of USB-C power adapter 110 in particular, have been described in the context of the USB 3.1 specification for power delivery, but this is not necessarily so, and other types of power adapters are expected to benefit from the teachings of the current disclosure. In particular, where an information handling system utilizes a dedicated power input, the associated power adapter and the information handling system may be configured to enable communication via the power input, as needed or desired. For example, a power adapter may communicate a Power Source Identification (PSID) that is utilized by the information handling system via the dedicated power input to inform the information handling system of the capabilities of the power adapter.

Where such a function is implemented between a power adapter and an information handling system, the teaching of the current disclosure may be adapted to be provided via the dedicated power input of the information handling system. Such a power adapter may provide power to the information handling system, and also communicate with the information handling system via a two-wire cable between the power adapter and the information handling system. Other mechanisms for communication between a power adapter and an information handling system may be utilized as needed or desired. For example, a wireless communication channel may be provided between a power adapter and an information handling system, such as a Near Field Communication (NFC) channel, a WiFi channel, an optical communication channel, or the like.

Figure 2:
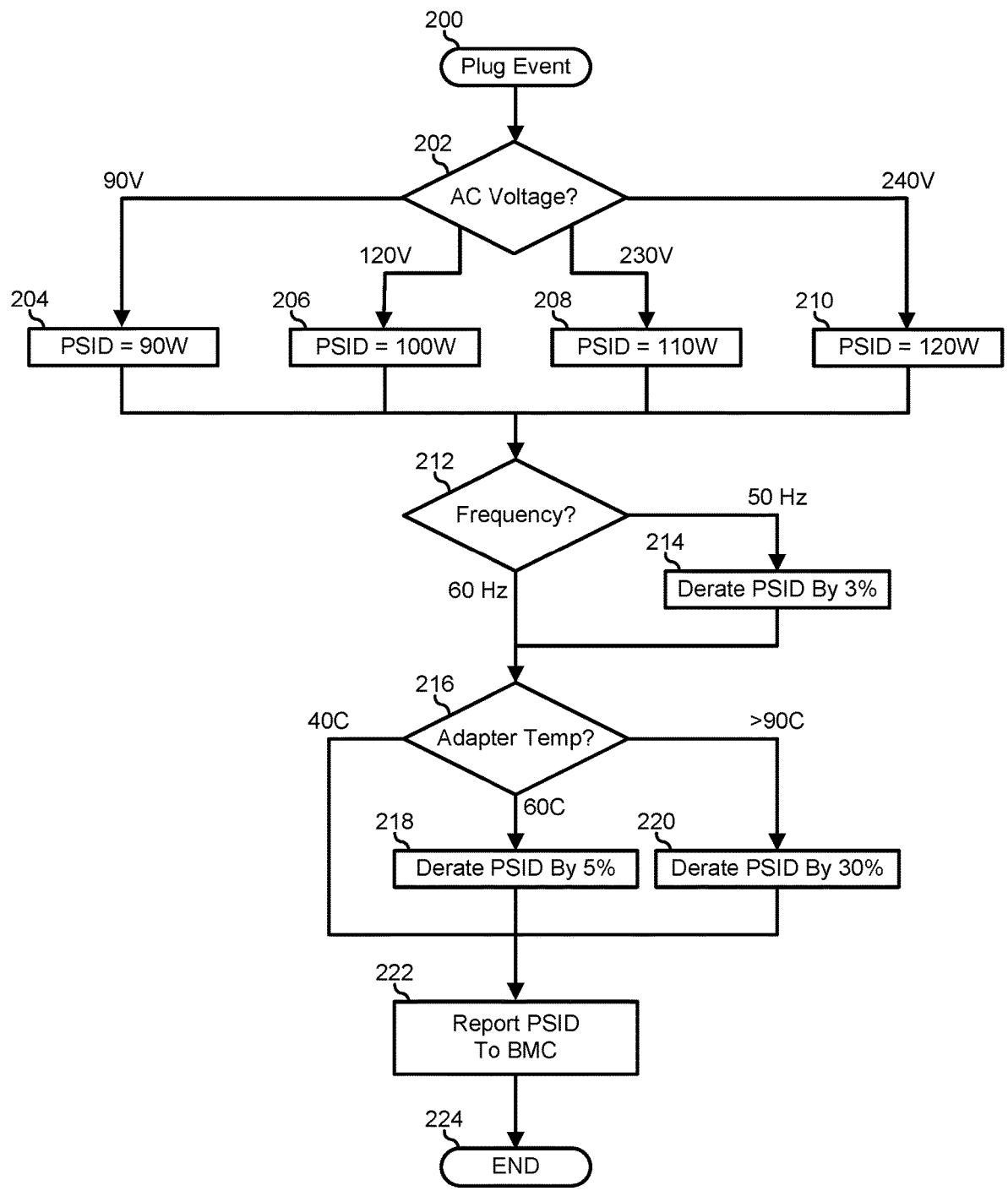
FIG. 2 is a flow chart illustrating a method for providing improved system performance using optimal power adapter efficiency for an information handling system according to an embodiment of the current disclosure.

FIG. 2 illustrates a method for providing improved system performance using optimal power adapter efficiency for an information handling system, starting with a system plug event in block 200. A decision is made as to the AC voltage that is supplied to a power adapter in decision block 202. Here, a power supply portion of a power adapter may provide an indication to a power delivery controller of the power adapter as to the voltage received from an AC power source. If the AC voltage is less than or equal to 90V AC, a first branch of decision block 202 is taken, a PSID value is set by the power delivery controller at 90 W in block 204, and the method proceeds to decision block 212 as described below.

If the AC voltage is less than or equal to 120V AC, a second branch of decision block 202 is taken, the PSID value is set by the power delivery controller at 100 W in block 206, and the method proceeds to decision block 212. If the AC voltage is less than or equal to 230V AC in block 208, a third branch of decision block 202 is taken, the PSID value is set by the power delivery controller at 110 W in block 210, and the method proceeds to decision block 212. If the AC voltage is less than or equal to 240V AC, a fourth branch of decision block 202 is taken, the PSID value is set by the power delivery controller at 120 W, and the method proceeds to decision block 212. Here, it may be understood that if the AC voltage is greater than 240V AC, an error condition may be indicated by the power delivery module, as needed or desired.

After the PSID value is set in one of blocks 204, 206, 208, or 210, a decision is made as to the frequency of the power that is supplied to the power adapter in decision block 212. Here, the power supply portion of the power adapter may provide an indication to the power delivery controller of the power adapter as to the frequency of the AC power source. If the frequency of the power that is supplied to the power adapter is 50 Hz, a first branch of decision block 212 is taken, the PSID value is derated by 3% in block 214, and the method proceeds to decision block 216 as described below. If the frequency of the power that is supplied to the power adapter is 60 Hz, a second branch of decision block 212 is taken and the method proceeds to decision block 216. Here, it may be understood that if the frequency is neither 50 Hz nor 60 Hz, an error condition may be indicated by the power delivery module, as needed or desired.

At decision block 216, a decision is made as to the temperature of the power adapter. If the temperature of the power adapter is less than or equal to 40 degrees Celsius (40 C), a first branch of decision block 216 is taken, the PSID value is reported to a BMC of the information handling system in block 222, and the method ends in block 224. If the temperature of the power adapter is less than or equal to 60 C, a second branch of decision block 216 is taken, the PSID value is derated by 5% in block 218, the PSID value is reported to the BMC in block 222, and the method ends in block 224. If the temperature of the power adapter is less than or equal to 90 C, a thidr branch of decision block 216 is taken, the PSID value is derated by 30% in block 220, the PSID value is reported to the BMC in block 222, and the method ends in block 224. Here, it may be understood that if the temperature is greater than 90 C, an error condition may be indicated by the power delivery module, as needed or desired.

Figure 3:
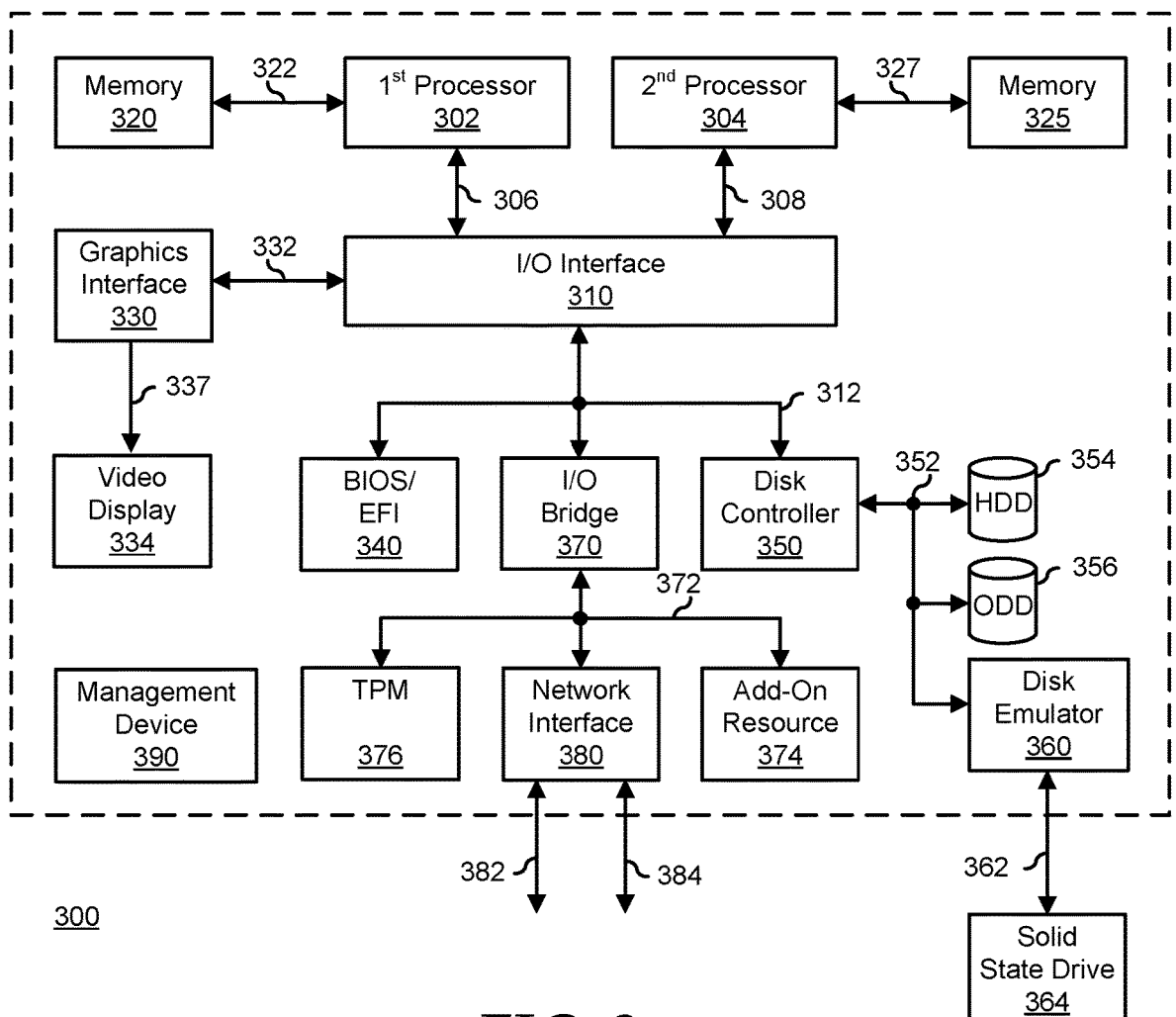
FIG. 3 is a block diagram illustrating a generalized information handling system according to another embodiment of the current disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power adapter to provide power to an information handling system, the power adapter comprising:
   a power supply configured to receive an alternating current (AC) input at one of a plurality of input voltages, and to provide a direct current (DC) output at one of a plurality of output voltages, each output voltage being associated with a current limit; and
   a power delivery controller configured to:
      determine, upon being plugged into an AC power source, a first input voltage of the AC power source;
      determine a DC power delivery capability of the information handling system;
      set a first output voltage and a first current limit of the power supply DC output based upon the first input voltage and the DC power delivery capability, the first output voltage and the first current limit defining a first power limit to the information handling system;
      determine that the power supply can provide a second power limit that is less than the first power limit based upon an operating condition of the power supply, wherein the operating condition includes a frequency of the AC power source; and
      communicate the second power limit to the information handling system.

2. The power adapter of claim 1, wherein the power delivery controller is further configured to:
   set at least one of a second output voltage and a second current limit of the power supply DC output, the at least one of the second output voltage and the second current limit defining the second power limit.

3. The power adapter of claim 1, wherein the operating condition includes a temperature of the power adapter.

4. The power adapter of claim 1, wherein the operating condition includes an efficiency of a power conversion by the power supply of the AC input to the DC output.

5. The power adapter of claim 1, wherein the power adapter provides the power to the information handling system via a USB-C cable.

6. The power adapter of claim 5, wherein the power delivery controller communicates with the information handling system via the USB-C cable.

7. The power adapter of claim 1, wherein the power adapter provides the power to the information handling system via a two-wire cable.

8. The power adapter of claim 7, wherein the power delivery controller communicates with the information handling system via the two-wire cable.

9. A method to provide power to an information handling system, the method comprising:
   receiving, by a power supply of a power adapter, an alternating current (AC) input at one of a plurality of input voltages;
   providing, by the power supply, a direct current (DC) output to the information handling system at one of a plurality of output voltages, each output voltage being associated with a current limit; and
   determining, by a power delivery controller, upon being plugged into an AC power source, a first input voltage of the AC power source;
   determining DC power delivery capability of the information handling system;
   setting a first output voltage and a first current limit of the power supply DC output based upon the first input voltage and the DC power delivery capability, the first output voltage and the first current limit defining a first power limit to the information handling system; and
   determining that the power supply can provide a second power limit that is less than the first power limit based upon an operating condition of the power supply, wherein the operating condition includes a frequency of the AC power source.

10. The method of claim 9, further comprising setting at least one of a second output voltage and a second current limit of the power supply DC output, the at least one of the second output voltage and the second current limit defining the second power limit.

11. The method of claim 9, wherein the operating condition includes a temperature of the power adapter.

12. The method of claim 9, wherein the operating condition includes an efficiency of a power conversion by the power supply of the AC input to the DC output.

13. The method of claim 9, wherein the power adapter provides the power to the information handling system via a USB-C cable.

14. The method of claim 9, wherein the power adapter provides the power to the information handling system via a two-wire cable.

15. A power system, comprising:
   an information handling system; and
   a power adapter comprising a power supply configured to receive an alternating current (AC) input at one of a plurality of input voltages, and to provide a direct current (DC) output at one of a plurality of output voltages to the information handling system, each output voltage being associated with a current limit, the power adaptor including a power delivery controller configured to:

determine, upon being plugged into an AC power source, a first input voltage of the AC power source;

determine a DC power delivery capability of the information handling system;

set a first output voltage and a first current limit of the power supply DC output based upon the first input voltage and the DC power delivery capability, the first output voltage and the first current limit defining a first power limit to the information handling system;

determine that the power supply can provide a second power limit that is less than the first power limit based upon an operating condition of the power supply, the operating condition including a frequency of the AC power source; and communicate the second power limit to the information handling system.

* * * * *